United States Patent Office

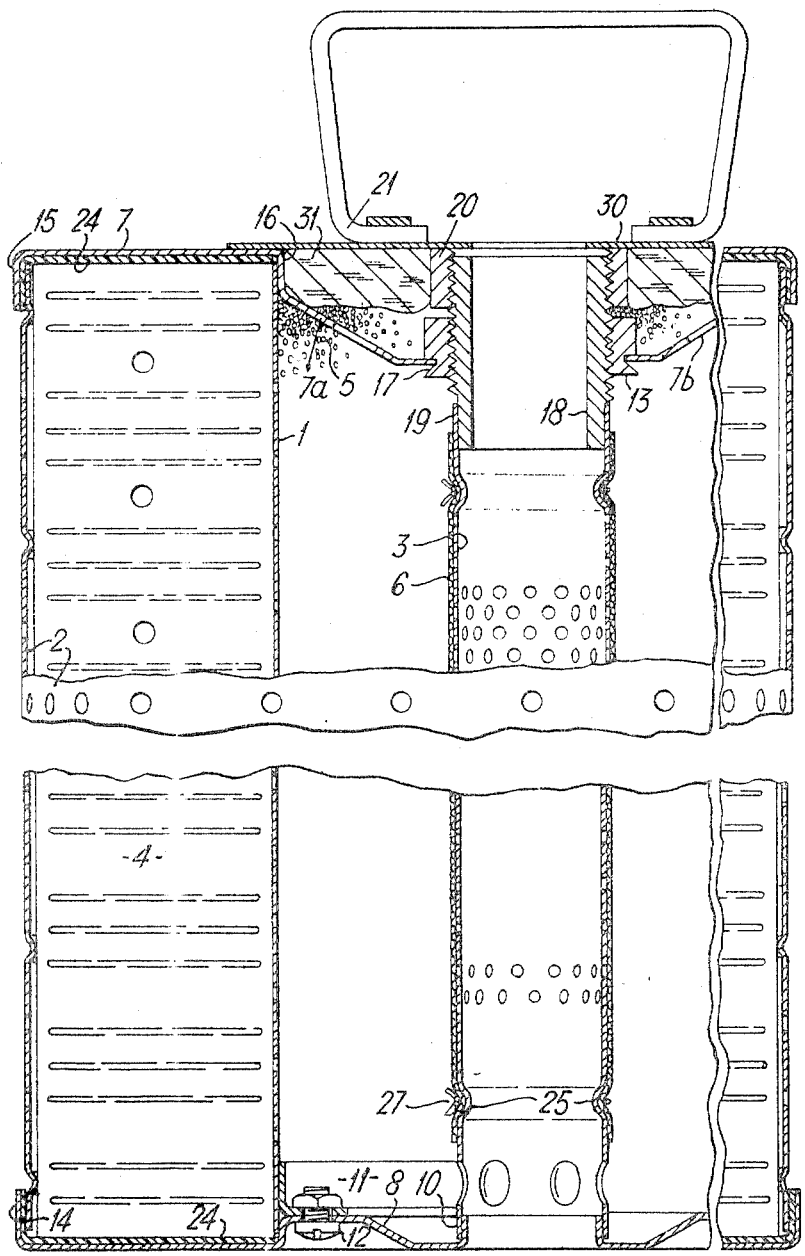

3,487,940
Patented Jan. 6, 1970

3,487,940
LIQUID FILTER ASSEMBLIES
Stanley Thomas Morris, Southampton, England, assignor to General Motors Corporation, Detroit, Mich., a corporation of Delaware
Filed May 16, 1968, Ser. No. 729,568
Claims priority, application Great Britain, May 17, 1967, 22,799/67
Int. Cl. B01d 29/08
U.S. Cl. 210—266                                    4 Claims

ABSTRACT OF THE DISCLOSURE

A filter assembly having a perforate centre tube, an inner annular filter element consisting of carbon granules retained between the centre tube and an inner support tube, an outer pleated paper element retained between the inner support tube and an outer support tube, and end caps which locate the elements and tubes co-axially and are detachable to permit dismantling of the assembly and replacement of the elements, one end cap being dished and perforated to serve as a filler funnel when replacing the carbon granules and being sealed by a cover plate with a carrier handle thereon.

RELATED APPLICATIONS

The present invention is an improvement in or modification of the filter assembly disclosed in U.S. patent application Ser. No. 597,090.

This invention relates to liquid filter assemblies and in particular to filter assemblies which are suitable for the filtration of solvents such as are used in dry cleaner processes.

In a filter assembly according to U.S. patent application 597,090 an inner and an outer perforate support tube are arranged about a perforate centre tube, an outer annular filter element is arranged between said support tubes, a granular mass which constitutes an inner annular filter element is arranged between the centre tube and inner support tube, a layer of permeable fabric or like filter material is secured around said centre tube and within the inner annular element, and the centre and support tubes are coaxially located by, and are connected at their respective opposite ends to, a pair of annular end plates in such a manner as to permit repeated dismantling of the assembly and replacement of the filter elements therein.

In one embodiment of such a filter assembly the centre tube is secured at one end to one end plate, as by brazing, welding or screwing, and at its other end has a nut secured thereon so as to secure the other end plate thereon and clamp the inner and outer support tubes between the end plates.

Such a filter assembly is modified, according to the present invention, by forming said other end plate with a centrally dished portion which is engaged by the nut so as to secure said other end plate to said outer end of the centre tube, said centrally dished portion having therein a plurality of apertures and an annular cover plate which overlies the centrally dished portion being secured and sealed to the said other end plate, as by means of a further nut which is secured to said cover plate and which screws on to said other end of the centre tube.

The invention and the method by which it is to be performed are hereinafter particularly described with reference to the accompanying drawings in which the single figure is a part vertical section through a filter assembly according to this invention.

The filter assembly shown comprises inner and outer perforate support tubes 1, 2 arranged about a perforate centre tube 3, an outer annular filter element 4 arranged between the support tubes 1, 2, an inner annular filter element 5 arranged between the centre tube 3 and the inner support tube 1, and a layer of permeable woven plastics fabric 6 secured about the centre tube 3, the centre tube 3 and the inner and outer support tubes 1, 2 being coaxially located by upper and lower end plates 7, 8.

The lower end plate 8 is formed with an inner neck to which is secured, as by welding or brazing one end 10 of the centre tube 3. Secured coaxially of the end plate 8 and around the neck is an annular collar 11 which is preferably detachably fixed to the end plate, as shown, by screws 12 but may be fixed in any other convenient manner. The collar 11 serves to locate one end of the inner support tube 1; and at its outer periphery the end cap 8 has a peripheral flange 14 which serves to locate the outer support tube 2 coaxially of the assembly.

The upper end plate 7 has a centrally dished portion 7a and is formed at its outer periphery with an annular flange 15 which serves to locate the other end of the outer support tube 2; and intermediate its inner and outer peripheries the end plate 7 is formed with an annular shoulder 16 which serves to locate the inner support tube 1 coaxially relative to the centre tube 3 and the outer support tube 2. The dished portion 7a has a plurality of apertures 7b therein.

The inner peripheral portion of the end plate 7 is secured in an external annular flange 17 on a nut 13 which screws on to the externally threaded upper end of a bush 18 the lower end of which fits within and is secured to the other end 19 of the centre tube 3.

A retainer nut 20 to which is attached an annular cover plate 30 carrying a handle 21 is screwed on to the threaded end of the bush 18 so as to secure the cover plate 30 against the end plate 7. The end plates 7, 8 are clamped against the ends of the inner and outer perforate support tubes 1, 2 when the nut 13 is screwed on to the bush 18.

An annular resilient pad 31 of felt or like material is retained in the dished portion 7a of the upper end plate 7 by the cover plate 30.

The outer filter element 4 is preferably formed of a strip of synthetic resin impregnated filter paper which is folded about a regularly spaced series of fold lines so as to form an annular filter element in which the fold lines extend longitudinally of the annulus, the element being of star form in section.

Annular gaskets 24 are secured to the end plates 7, 8 so as to abut and form a seal with the opposite ends of the element 4 adjacent the inner peripheral portion thereof.

The inner filter element 5 comprises a mass of activated charcoal granules which are retained in the annular space between the inner perforate support tube 1 and the sleeve 6 of plastics fabric, the ends of the latter conveniently being secured to annular grooved portions 25 of the centre tube 3 by string ties 27; alternatively spring clips or other securing devices could be used.

The carbon granules are maintained in position by the pressure of the central recessed portion 7a of the end plate 7 when the nut 13 is tightened on to the threaded end of the bush 18, and by the annular pad 31 of felt or like material which is pressed against the charcoal granules in the recessed portion 7a of the end plate 7 when the cover plate 30 and nut 20 are screwed on to the bush 18.

When the filter elements are to be replaced after use, the cover plate 30 and the end plate 7 are first unscrewed from the bush 18 on the centre tube 3, the outer element 4 then being lifted out and the carbon granules 5 then being tipped out from the space between the centre tube 4 and inner support tube 1. A new outer filter element 4 is then inserted between the inner and outer support tubes 1, 2 and the end plate 7 replaced. The nut 13 with the end plate 7 is then screwed on to the bush 18 on the centre tube 3 so as to clamp the inner and outer support tubes 1, 2 between the end plates 7 and 8, and when the end plate 7 has been re-affixed in this manner the centrally dished portion 7a thereof can be used as a filler funnel to facilitate the re-charging of the assembly with fresh carbon granules. During this operation a plug is preferably inserted in the bore of the centre tube 3; and after the space between the centre tube 3 and the inner support tube 2 is charged with the carbon granules 5 the resilient annular pad 31 of permeable material such as felt is placed in the recessed portion 7a of the end plate 7 and the cover plate 30 is then screwed on to the bush 18 on the centre tube 3 so as to clamp the cover plate 30 against the end plate 7 and press the pad 31 down on to the upper surface of the charge of carbon granules 5.

The nut 13 which engages the centrally dished portion 7a of the end plate 7 is preferably loosely but permanently attached to the inner edge portion thereof to facilitate the assembly and disassembly of the filter assembly.

I claim:

1. A filter assembly comprising inner and outer perforate support tubes arranged about a perforate centre tube, an outer annular filter element arranged between said support tubes, a granular mass which constitutes an inner annular filter element arranged between the centre tube and inner support tube, a layer of permeable filter material secured around said centre tube between said centre tube and the inner annular filter element, the centre and support tubes being coaxially located by, and connected at their respective opposite ends to, a pair of annular end plates, one of said end plates being secured to one end of the centre tube, the other end plate having a centrally dished and apertured portion and being detachably secured to the other end of the centre tube so as to clamp the support tubes between the end plates, an annular pad of resilient material located within said centrally dished and apertured portion, and an annular cover plate detachably secured in fluid sealing engagement with said other end plate around the entire periphery of said centrally dished and apertured portion to prevent fluid from escaping therefrom, said cover plate overlying the centrally dished and apertured portion and said annular pad, said annular pad being pressed by said cover plate against the upper portions of said granular mass to maintain the granular mass in compression.

2. A filter assembly according to claim 1, in which said inner filter element consists of a mass of activated charcoal granules.

3. A filter assembly accsrding to claim 1, in which said other end plate is secured to the centre tube by a nut which screws on to the centre tube at said other end thereof.

4. A filter assembly according to claim 3, in which said cover plate is adapted to be screwed on to said other end of the centre tube.

References Cited

UNITED STATES PATENTS

| | | |
|---|---|---|
| 2,174,528 | 10/1939 | Prentiss. |
| 2,413,991 | 1/1947 | Newman _____ 210—457 |
| 2,464,036 | 3/1949 | Hasselwander _____ 210—457 |
| 3,189,179 | 6/1965 | McMichael _____ 210—266 X |

REUBEN, FRIEDMAN, Primary Examiner

W. S. BRADBURY, Assistant Examiner

U.S. Cl. X.R.

210—282, 315, 350, 489